United States Patent
Sasaki et al.

(10) Patent No.: US 6,214,448 B1
(45) Date of Patent: Apr. 10, 2001

(54) MAGNETIC RECORDING MEDIUM

(75) Inventors: Hideki Sasaki; Naoyuki Nagashima; Masatoshi Uchida; Shigeyo Miyamori, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/276,486

(22) Filed: Mar. 25, 1999

(30) Foreign Application Priority Data

Mar. 31, 1998 (JP) .................................................. 10-085335

(51) Int. Cl.$^7$ ..................................................... G11B 5/702
(52) U.S. Cl. ........................ 428/216; 428/425.9; 428/522; 428/694 BG; 428/694 BU
(58) Field of Search ................................ 428/216, 425.9, 428/522, 694 BG, 694 BU, 900

(56) References Cited

U.S. PATENT DOCUMENTS

| | | | |
|---|---|---|---|
| 5,443,913 | 8/1995 | Kohno et al. | 428/425.9 |
| 5,503,938 | * 4/1996 | Arudi | 428/423.1 |
| 5,688,591 | 11/1997 | Kuwajima et al. | 428/323 |

FOREIGN PATENT DOCUMENTS

| | | |
|---|---|---|
| 63-261523 | 10/1988 | (JP) . |
| 2-101624 | 4/1990 | (JP) . |
| 6-10860 | 2/1994 | (JP) . |
| 8-165372 | 6/1996 | (JP) . |
| 9-265623 | 10/1997 | (JP) . |

* cited by examiner

Primary Examiner—Steven A. Resan
(74) Attorney, Agent, or Firm—Oblon, Spivak, McClelland, Maier & Neustadt, P.C.

(57) ABSTRACT

Disclosed is a magnetic recording medium excellent in surface properties, good in electromagnetic characteristics, and excellent in durability, which comprises a non-magnetic support and a magnetic layer formed thereon, wherein said magnetic layer contains a ferromagnetic powder, and as binders, at least a vinyl chloride resin having a S-containing polar group and a polyurethane resin having phosphobetaine and/or phosphamine as a polar group.

28 Claims, 1 Drawing Sheet

FIG. 1

MAGNETIC RECORDING MEDIUM

FIELD OF THE INVENTION

The present invention relates to a magnetic recording medium, and particularly to a magnetic recording medium improved in electromagnetic characteristics and durability and further excellent in productivity.

BACKGROUND OF THE INVENTION

In recent years, for avoiding deterioration of signals caused by repeated copies, digitization of magnetic recording media has proceeded. Further, the recording density thereof has also been desired to be increased, because of an increase in the amount of recording data.

As magnetic powders, therefore, finer magnetic metal powders having high saturation magnetic flux density have been used. However, when such magnetic metal powders are used, the dispersibility of the magnetic metal powders greatly affects the characteristics of the media.

That is to say, the poor dispersibility of the magnetic metal powders and other inorganic pigments deteriorates the surface properties of the media and the magnetic characteristics, which causes deterioration of the electromagnetic characteristics (output) and the durability.

As measures to solve such a problem, it has been studied that the dispersibility of the powders is improved by the use of binders having polar groups high in adsorptivity to the magnetic metal powders.

Specific examples thereof include the use of binders comprising polymers having —COOX, —$SO_3$X, —$OSO_2$X, —$PO_3X_2$ or —$OPO_3X_2$ as the polar groups [wherein X represents —$NR_1R_2R_3R_4$ ($R_1$, $R_2$, $R_3$ and $R_4$ each represents a hydrogen atom, or an alkyl, alkenyl, substituted alkyl or substituted alkenyl group having 1 to 12 carbon atoms)] (Japanese Unexamined Patent Publication No. 63-261523), the use of binders composed of resin components having —COOM, —$SO_3$M, —$OSO_3$M or —PO(OM')$_2$ as the polar groups [wherein M represents a hydrogen atom or an alkali metal atom, and M' represents a hydrogen atom, an alkali metal atom or a lower hydrocarbon group] (Japanese Examined Patent Publication No. 6-10860, Japanese Unexamined Patent Publication No. 8-165372, Japanese Unexamined Patent Publication No. 8-77460 and Japanese Unexamined Patent Publication No. 9-265623), and the use of binders containing polyurethane resins in which negative functional groups form internal salts (Japanese Unexamined Patent Publication No. 2-101624).

However, with the recent increase in capacity of digital recording media, head gaps become narrow to bring about the liability of heads to clog, and the number of repetitions of reading and writing is also increased. Accordingly, higher levels of the dispersibility and durability have been desired particularly in disk media, so that it has also become necessary to enhance the dispersibility of carbon black and abrasives which are additives used together with the magnetic powders.

When the binders having the polar groups described in Japanese Unexamined Patent Publication No. 63-261523 and the like described above are used, the dispersibility of the magnetic metal powders is improved, but a balance between the paint stability or the paint viscosity and the yield value thereof is insufficient. They are therefore not satisfactory in this respect.

As a measure for preventing the clogging of heads, addition of $Cr_2O_3$ has hitherto been known, and as a means for enhancing the durability, it has formerly been known that large-sized carbon is added to reduce the friction of coated films. However, the polar groups such as —COOM, —$SO_3$M, —$OSO_3$M (wherein M is K, Na or H) and metal salts of sulfamic acid, shown in Japanese Unexamined Patent Publication No. 63-261523, Japanese Examined Patent Publication No. 6-10860, Japanese Unexamined Patent Publication No. 8-165372 and Japanese Unexamined Patent Publication No. 9-265623 described above, improve the dispersion of the magnetic metal powders but the total dispersion became insufficient, because the material characteristics of carbon or $Cr_2O_3$ were largely different from those of the magnetic metal powders. On the other hand, the use of amine polar groups which have previously been known to provide good dispersion of carbon or $Cr_2O_3$ resulted in the difficulty in dispersing the magnetic metal powders. Further, even if resins having acid polar groups excellent in the dispersion of the magnetic metal powders, such as —COOM, —$SO_3$M, —$OSO_3$M (wherein M is K, Na or H) and metal salts of sulfamic acid, shown in Japanese Unexamined Patent Publication No. 63-261523, Japanese Examined Patent Publication No. 6-10860, Japanese Unexamined Patent Publication No. 8-165372 and Japanese Unexamined Patent Publication No. 9-265623, and resins having amine polar groups are used as mixtures, the synergistic effect can not be obtained.

That is to say, the media prepared by such resin mixture systems have the problem that carbon and $Cr_2O_3$ are liable to drop out of coated films to cause the clogging of heads and a reduction in durability, because the resins having acid polar groups are incorporated therein. As to the magnetic metal powders, the inconvenience also has occurred that the dispersibility becomes insufficient to deteriorate the surface properties, resulting in difficulty in obtaining high output, because the resins having the amine polar groups are incorporated therein. Further, coated surfaces formed are significantly affected by the dispersion of paints, and paints insufficiently dispersed have the inconvenience that fine coating streaks are developed, when the paints are applied. In particular, this phenomenon has been significant in coating by the wet-on-wet process.

Media having the coating streaks have large spacing loss between heads and the media, so that the output is low and the durability is also poor, which has been a great factor for deteriorating the quality of the magnetic recording media.

SUMMARY OF THE INVENTION

It is therefore an object of the present invention to provide a magnetic recording medium excellent in surface properties, good in electromagnetic characteristics and excellent in durability by improving the dispersibility of a magnetic powder, and carbon black and an abrasive in a binder.

As a result of intensive investigation for attaining the above-mentioned object, the present inventors have discovered that the use of a vinyl chloride resin having a S-containing polar group in combination with a polyurethane resin having phosphobetaine or phosphamine as a polar group greatly improves the dispersibility of not only a magnetic metal powder, but also an additive such as an abrasive or carbon black, and also largely enhances the durability, thus completing the present invention.

That is to say, the present invention provides:

(1) A magnetic recording medium comprising a nonmagnetic support and a magnetic layer formed thereon, in which said magnetic layer contains a magnetic metal powder, and as binders, at least a vinyl chloride resin having a S-containing polar group and a polyurethane resin having phosphobetaine and/or phosphamine as a polar group;

(2) The magnetic recording medium described in the above (1), in which said magnetic layer contains a ferromagnetic powder, an abrasive and carbon black;

(3) The magnetic recording medium described in the above (2), in which said abrasive is at least one of α-$Al_2O_3$ and $Cr_2O_3$;

(4) The magnetic recording medium described in the above (1) or (2), in which said magnetic recording medium has the magnetic layer on the non-magnetic support through a non-magnetic layer;

(5) The magnetic recording medium described in the above (1) or (2), in which the ferromagnetic powder is a magnetic metal powder having a coercive force (Hc) of 1300 Os to 2800 Os;

(6) The magnetic recording medium described in the above (4), in which the average thickness of the magnetic layer is 1.0 µm or less, and the average thickness of the non-magnetic layer is 1 µm to 3 µm;

(7) The magnetic recording medium described in the above (4) or (6), in which the non-magnetic layer is formed on the non-magnetic support, and the magnetic layer is formed thereon in multiple layers simultaneously or successively while the non-magnetic layer is still in a wet state;

(8) The magnetic recording medium described in the above (4) or (6), in which the non-magnetic layer is formed on the non-magnetic support, and after drying and hardening thereof, the magnetic layer is formed thereon;

(9) The magnetic recording medium described in the above (1), in which said vinyl chloride resin has a —$OSO_3M$ or —$SO_3M$ group (wherein M is selected from the group consisting of H and an alkali metal) as the S-containing polar group;

(10) The magnetic recording medium described in the above (1), in which said vinyl chloride resin contains the S-containing polar group in an amount of 0.01% to 10% by weight per molecule, in terms of atomic sulfur;

(11) The magnetic recording medium described in the above (1), in which the amount of phosphobetaine and/or phosphamine ranges from 0.01 mmol/g to 1.0 mmol/g, preferably from 0.03 mmol/g to 0.5 mmol/g;

(12) The magnetic recording medium described in the above (1), in which the number average molecular weight of the polyurethane resin ranges from 5,000 to 200,000, preferably from 10,000 to 100,000;

(13) The magnetic recording medium described in the above (1), in which the average polymerization degree ranges from 100 to 700;

(14) The magnetic recording medium described in the above (1), in which the weight ratio of the vinyl chloride resin to the polyurethane resin is from 9/1 to 5/5; and (15) The magnetic recording medium described in the above (3), in which the particle size of α-$Al_2O_3$ is from 0.1 µm to 1.0 µm, the particle size of $Cr_2O_3$ is from 0.1 µm to 1.0 µm, and the particle size of carbon black is from 100 nm to 500 nm.

DESCRIPTION OF THE PREFERRED EMBODIMENTS

In the present invention, the use of a polyurethane resin having phosphobetaine and/or phosphamine as a polar group and a vinyl chloride resin having a S-containing polar group as a mixture allows pigments different from one another in properties, namely a magnetic metal, carbon and chromium oxide, to be satisfactorily dispersed.

This is because the polyurethane resin having phosphobetaine and/or phosphamine as the polar group is also excellent in dispersibility of the magnetic metal powder, different from conventional resins having only amine polar groups. The reason for this is not clear, but this is deduced to be caused by the interaction of the surface properties of the magnetic metal powder (pH, the kind of polar group and the like) and the structure of phosphobetaine or phosphamine.

Thus, mixing materials which have been difficult to be dispersed by conventional resin compositions can be dispersed simultaneously and satisfactorily, so that the surface properties of coated films are greatly improved compared with the conventional ones. Further, good coated surfaces having no coating streaks are also obtained, and therefore, the spacing loss between the heads and the media is small and the electromagnetic characteristics are excellent. Moreover, carbon black and $Cr_2O_3$ do not drop off, so that they effectively function as additives to improve the durability.

In the present invention, the polyurethane resin is required to have phosphobetaine or phosphamine as the polar group, which has both the properties of the phosphoric acid family considered to be related to the dispersion of the magnetic metal powder and the properties of the amine family satisfactory in the dispersion of carbon black and $Cr_2O_3$. When the polyurethane resin does not have phosphobetaine or phosphamine which simultaneously functions as the phosphoric acid polar group and the amine polar group by one polar group, the dispersion becomes insufficient, resulting in the failure to achieve the object of the present invention. The polar group contained in the polyurethane resin is phosphobetaine or phosphamine, which may be used alone or as a mixture thereof. Phosphobetaine is an inner salt which comprises an ammonium salt as a cationic ion and an anionic ion from phosphonic acid, phosphinic acid or acid phosphate compounds, and phosphamine is an amide substitute of phosphonic acid, phosphinic acid or acid phosphate compounds. The amount thereof is preferably within the range of 0.01 mmol/g to 1.0 mmol/g, and more preferably within the range of 0.03 mmol/g to 0.5 mmol/g. If the amount of the polar group is less than 0.01 mmol/g, an insufficient effect tends to be observed in the dispersibility. On the other hand, if it exceeds 1.0 mmol/g, intermolecular or intramolecular coagulation is liable to occur to adversely affect the dispersibility, resulting in difficulty in obtaining the effect of the present invention. The number average molecular weight of the polyurethane resin is preferably within the range of 5,000 to 200,000, and more preferably within the range of 10,000 to 100,000. Less than 5,000 results in a reduction in the strength of a coated film to adversely affect the durability, whereas exceeding 200,000 lead to the possibility of generation of inconvenience in respect to the production of paints and coating procedures.

Although the polyurethane resins used in the present invention are synthesized by the reaction of polyols of high molecular weight and polyisocyanates and further other copolymers if necessary, similarly to usual methods for synthesizing polyurethanes, these polar groups may be contained in either the polyol components or the polyisocyanate components. Further, the polar groups may be introduced into the polymers as polymer reaction components. However, considering unreacted components and the rate of introduction, the reaction is rather easily controlled when the polymerization monomers containing the polar groups. The polymerization monomers are synthesized by the reaction of aminodiols with phosphonic acid derivatives, phosphinic acid derivatives or acid phosphates. A structural formula of the monomers are shown as follows:

wherein $R_1$ and $R_3$ are constituents of the diol and $R_2$ represents a phenyl group, an alkyl group or an alkylphenyl group of 1 to 40 of carbon atoms, and X is a residue of the phosphonic acid, the phosphinic acid or the acid phosphate. Examples of the aminodiols include, but are not limited to N-methyldiethanolamine, N-ethyldiethanol-amine, N-phenyldiethanolamine and diethanolamine. On the other hand, examples of phosphonic acid derivatives include, but are not limited to methylphosphonic acid, ethylphosphonic acid, phenylphosphonic acid, metylenediphosphonic acid and octadecylphosphonic acid, examples of phosphinic acid derivatives include phenylphosphinic acid, diphenylphosphinic acid and dimethylphosphinic acid, and examples of the acid phosphates include amyl acid phosphate, 2-ethylhexyl acid phosphate, methyl acid phosphate, ethyl acid phosphate and polyoxyethylene nonylphenyl ether phosphate [for example, RE 610 (registered trade name)]. A polymerization monomer obtained by the reaction of N-methyldiethanolamine with phenylphosphonic acid, octadecylphosphonic acid, methyl acid phosphate or polyoxyethylene nonylphenyl ether phosphate is preferably used among others.

Further, the vinyl chloride resins used in the present invention include vinyl chloride-vinyl acetate-vinyl alcohol copolymers, vinyl chloride-hydroxyalkyl (meth)acrylate copolymers, vinyl chloride-vinyl acetate-maleic acid copolymers, vinyl chloride-vinyl acetate-vinyl alcohol-maleic acid copolymers, vinyl chloride-hydroxyalkyl (meth)acrylate-maleic acid copolymers, vinyl chloride-vinyl acetate-vinyl alcohol-glycidyl (meth)acrylate copolymers, vinyl chloride-hydroxyalkyl (meth)acrylate-glycidyl (meth)acrylate copolymers, vinyl chloride-hydroxyalkyl (meth)acrylate-allyl glycidyl ether copolymers and vinyl chloride-vinyl acetate-vinyl alcohol-allyl glycidyl ether copolymers. In particular, copolymers of vinyl chloride and monomers containing epoxy (glycidyl) groups are preferred.

As such vinyl chloride copolymers, ones containing sulfuric acid groups and/or sulfo groups (hereinafter referred to as S-containing polar groups) are preferably used. In the S-containing polar groups ($-OSO_3M$ and $-SO_3M$), M may be either H or an alkali metal. However, it is particularly preferred that M is K. Either one or both of these S-containing polar groups may be contained. When both are contained, the ratio thereof may be any. These S-containing polar groups are preferably contained in an amount of 0.01% to 10% by weight, and particularly in an amount of 0.1% to 5% by weight per molecule, in terms of atomic sulfur. Less than 0.01% by weight results in the tendency of an insufficient effect to be observed in the dispersibility, whereas exceeding 10% by weight is liable to cause intermolecular or intramolecular coagulation to adversely affect the dispersibility, resulting in difficulty in obtaining the effect of the present invention. The average polymerization degree of the vinyl chloride resin is preferably within the range of 100 to 700, and more preferably within the range of 200 to 500. Less than 200 results in a reduction in the strength of a coated film to adversely affect the durability, whereas exceeding 700 lead to an increase in viscosity of the paint, which causes insufficient dispersion.

The above-described polyurethane resins and vinyl chloride resins can be thermoplastic resins, thermosetting or thermoreactive resin, electron beam (EB) sensitive modified resin and etc. Resins which have hydroxyl group(s) at a terminus or a side chain thereof are especially preferred because they may easily use a cross-linking reaction by an isocyanate. Hardners for cross-linking the resins by an isocyanate include Coronate L, HL, 3041 (manufactured by Nippon Polyurethane Co., Ltd.), 24A-100, TPI-100 (manufactured by Asahi Chemical Industries, Ltd.). Resins which are used in the present invention, unless especially indicated, are crosslinking (thermosetting) resins having the above-described hydroxyl group(s).

The most preferred mode of the present invention is to use the vinyl chloride resin having at least the S-containing polar group and the polyurethane resin having phosphobetaine and/or phosphamine as the polar group at the same time in the magnetic layer. When the vinyl chloride resin and the polyurethane resin are used as a mixture, the vinyl chloride/polyurethane weight ratio is from 9/1 to 5/5, and preferably from 8/2 to 6/4. If this ratio is higher than 9/1, a coated film tends to become brittle. On the other hand, this ratio is lower than 5/5, a coated film tends to become soft, resulting in deterioration of the durability. Further, a polyurethane resin having another polar group may be used in combination as so required. In that case, the content of the polyurethane resin containing phosphobetaine and/or phosphamine as the polar group is preferably 10% to 50% of the total resin components, and the other polar group of the polyurethane used in combination is preferably a S-containing polar group.

As ferromagnetic powders used in the magnetic layers of the present invention, known materials can be used. Examples thereof include magnetic oxide powders such as $\gamma$-$Fe_2O_3$, Co-containing $\gamma$-$Fe_2O_3$, $Fe_3O_4$, Co-containing $\gamma$-$Fe_3O_4$, $CrO_2$, barium ferrite and strontium ferrite, and magnetic metal powders such as metals, for example, Fe, Co and Ni, and alloys thereof.

These ferromagnetic powders may be selected depending on the medium species to be applied. Of these, the magnetic metal powders such as metals, for example, Fe, Co and Ni, and alloys thereof are preferred. Further, the ferromagnetic powders containing rare earth elements including Y as additive elements are also preferred.

The Hc thereof is preferably within the range of 1,300 Oe to 2,800 Oe, adjusting it to a drive system in existence or under development.

Further, in the present invention, it is preferred that the magnetic layers contain inorganic pigments. As the inorganic pigments, known ones can be used. However, they are preferably contained together with abrasives and carbon black. As the abrasives, $\alpha$-$Al_2O_3$ and $Cr_2O_3$ are preferred.

The particle size of $\alpha$-$Al_2O_3$ is preferably from 0.1 $\mu$m to 1.0 $\mu$m, and more preferably from 0.2 $\mu$m to 0.5 $\mu$m. If the particle size is less than 0.1 $\mu$m, the reinforcing effect is decreased to adversely affect the durability. On the other hand, exceeding 1.0 $\mu$m results in deterioration of the surface properties of coated films. The compounded amount thereof is preferably from 5 parts to 30 parts by weight, and more preferably from 10 parts to 20 parts by weight, based on the magnetic powder. Less than 5 parts by weight decreases the reinforcing effect to adversely affect the durability, whereas exceeding 30 parts by weight results in a significant decrease in output. Such α-Al$_2$O$_3$ includes AKP15, AKP20, AKP30, HIT50 and HIT60 (manufactured by Sumitomo Chemical Co., Ltd.).

The particle size of Cr$_2$O$_3$ is preferably from 0.1 μm to 1.0 μm, and more preferably from 0.2 μm to 0.5 μm. If the particle size is less than 0.1 μm, the abrasive effect is decreased to adversely affect the durability. On the other hand, exceeding 1.0 μm results in deterioration of the surface properties of coated films. The compounded amount thereof is preferably from 2 parts to 15 parts by weight, and more preferably from 5 parts to 10 parts by weight, based on the magnetic powder. Less than 2 parts by weight decreases the abrasive effect to adversely affect the durability, whereas exceeding 15 parts by weight conversely results in too high abrasive ability to lead to head wear and head crush. Such Cr$_2$O$_3$ includes S-1 and U-1 (manufactured by Nippon Industrial Chemical Co., Ltd.).

The particle size of carbon black is preferably from 100 nm to 500 nm, and more preferably from 200 nm to 400 nm. If the particle size is less than 100 nm, the friction of the magnetic layers is increased to deteriorate the durability. Exceeding 500 nm results in deterioration of the surface properties. The compounded amount thereof is preferably from 0.5 part to 10 parts by weight, and more preferably from 2 parts to 5 parts by weight, based on the magnetic powder. Less than 0.5 part by weight increases the friction to deteriorate the durability, whereas exceeding 10 parts by weight results in deterioration of the surface properties.

As to a construction of the coated film of the present invention, the magnetic layer may be formed either directly on the non-magnetic support or through the non-magnetic layer on the non-magnetic support. However, with the progress of high density recording, the magnetic layers becomes thinner. In particular, at an average thickness of 1 μm or less suitable for high density recording, the surface properties of base films affect the surface properties of coated films, and the absolute amount of lubricants is decreased to deteriorate the durability. Accordingly, the magnetic layer is preferably formed on lubricant-containing non-magnetic layer formed on the non-magnetic support. The average thickness of the non-magnetic layer is preferably between 1 μm and 3 μm. Thinner than 1 μm results in a decreased effect as the non-magnetic layer, whereas exceeding 3 μm causes poor coating properties in coating to provide unfavorable productivity. The average thickness is obtained as an average value of measured thickness at five points.

Methods for forming the above-mentioned magnetic layer and non-magnetic layer may be either wet-on-wet coating in which the magnetic layer is simultaneously formed on the non-magnetic layer while the non-magnetic layers is still in a wet state, or wet-on-dry coating in which the non-magnetic layer is formed, and after it has been dried, the magnetic layer is formed thereon. In the wet-on dry coating, considering the production efficiency, it is more preferred that the non-magnetic layer is produced by use of a radiation hardenable resin, and that it has been cured by radiation before the magnetic layer is formed.

Further, in the wet-on-wet coating, the magnetic layer may be formed after the non-magnetic layer has been formed, or both layers may be simultaneously formed. There is no particular limitation on coaters used in such coating processes. In coating of the magnetic layer in a single layer or coating in multiple layers by the wet-on-dry processes, a gravure coater, a reverse roll coater or a die nozzle coater can be used.

Further, in coating in multiple layers by the wet-on-wet processes, a gravure coater, a reverse roll coater or a die nozzle coater is preferably used for the lowermost layer, and a die nozzle coater is preferably used for other layers. When the die nozzle coater is used, either a coater having a plurality of coating nozzles or a plurality of coaters each having one coating nozzle may be used.

EXAMPLE 1

<Magnetic Paint 1 for Upper Layer>

| | |
|---|---|
| Magnetic metal powder (Hc = 1,650 Oe, σS = 126 emu, BET = 58 m$^2$/g, pH = 10, average length of major axis: 0.32 μm, Fe/Co/Ni = 100/5/5 (weight ratio), containing Al and Si as additive elements) | 100 parts by weight |
| Vinyl chloride copolymer (MR110, manufactured by Nippon Zeon Co., Ltd.) (polymerization degree: 300, polar group: —OSO$_3$K = 1.5 groups/molecule) | 14 parts by weight |
| Phosphobetaine-containing polyurethane resin which comprises phosphobetaine as polar groups obtained by a reaction of N-methyl-diethanolamine and phenylphosphonic acid (Mw = 40,000, polar group concentration: 1.5 groups/molecule | 4 parts by weight |
| —SO$_3$Na-containing polyurethane resin (Mn = 25,000, polar group concentration: 1 group/molecule) | 2 parts by weight |
| α-Al$_2$O$_3$ (AKP30, manufactured by Sumitomo Chemical Co., Ltd. (average particle size: 0.33 μm, BET: 8 m$^2$/g) | 10 parts by weight |
| Cr$_2$O$_3$ (S-1, manufactured by Nippon Industrial Chemical Co., Ltd.) (average particle size: 0.40 μm, BET: 3 m$^2$/g) | 5 parts by weight |
| Carbon black (Sevacurve MT manufactured by Colombian Carbon Co. (particle size: 350 nm, BET: 7 m$^2$/g, DBP oil absorption: 41 ml/100 g) | 3 parts by weight |
| Sorbitan monostearate | 3 parts by weight |
| Isocetyl stearate | 3 parts by weight |
| Butyl stearate | 2 parts by weight |
| MEK | 250 parts by weight |
| Toluene | 80 parts by weight |
| Cyclohexanone | 80 parts by weight |

The above-mentioned composition was kneaded, and then, dispersed in a sand grinder mill to prepare the magnetic paint 1 for an upper layer.

Then, 4 parts by weight of Coronate L manufactured by Nippon Polyurethane Co., Ltd. was added to the magnetic paint 1 for the upper layer, and the paint for the upper layer was applied to a 62-μm thick PET film having a surface roughness (Ra) of 9 nm so as to give a thickness of 2.5 μm (dry film thickness) by the extrusion die nozzle process, followed by non-orientation with a non-orientation magnet. After drying at a drying temperature of 100° C., calendaring treatment was carried out at a linear pressure of 300 kg/cm at a temperature of 60° C. to form a coated film on one side. Then, in a similar procedure, a coated film was formed on the other side of the PET film to prepare a raw sheet roll having magnetic layers on both side.

Finally, this raw sheet roll was stamped out in a disk form, followed by thermosetting at 70° C. for 24 hours to prepare a disk.

EXAMPLE 2

A disk was prepared in the same manner as with Example 1 with the exception that the phosphobetaine-containing polyurethane resin of the magnetic paint 1 for the upper layer used in Example 1 was changed to a polyurethane resin containing phosphamine obtained by a reaction of diethanolamine and phenylphosphonic acid.

EXAMPLE 3

A disk was prepared in the same manner as with Example 1 with the exception that the phosphobetaine-containing polyurethane resin of the magnetic paint 1 for the upper layer used in Example 1 was changed to a polyurethane resin containing a phosphobetaine obtained by a reaction of N-methyldiethanolamine and phenylphosphonic acid and a phosphamine obtained by a reaction of diethanolamine and phenylphosphonic acid per one molecule of the polyurethane resin.

Comparative Example 1

A disk was prepared in the same manner as with Example 1 with the exception that the phosphobetaine-containing polyurethane resin of the magnetic paint 1 for the upper layer used in Example 1 was changed to a polyurethane resin having no polar group.

Comparative Example 2

A disk was prepared in the same manner as with Example 1 with the exception that the phosphobetaine-containing polyurethane resin of the magnetic paint 1 for the upper layer used in Example 1 was changed to a polyurethane resin having sulfobetaine as a polar group.

Comparative Example 3

A disk was prepared in the same manner as with Example 1 with the exception that the phosphobetaine-containing polyurethane resin of the magnetic paint 1 for the upper layer used in Example 1 was changed to a polyurethane resin having sodium sulfamate as a polar group.

Comparative Example 4

A disk was prepared in the same manner as with Example 1 with the exception that the phosphobetaine-containing polyurethane resin of the magnetic paint 1 for the upper layer used in Example 1 was changed to a polyurethane resin having sodium phosphate as a polar group.

Comparative Example 5

A disk was prepared in the same manner as with Example 1 with the exception that the phosphobetaine-containing polyurethane resin of the magnetic paint 1 for the upper layer used in Example 1 was changed to a polyurethane resin having sodium sulfonate as a polar group.

Comparative Example 6

A disk was prepared in the same manner as with Example 1 with the exception that the phosphobetaine-containing polyurethane resin of the magnetic paint 1 for the upper layer used in Example 1 was changed to a polyurethane resin having an ammonium salt as a polar group.

Comparative Example 7

A disk was prepared in the same manner as with Example 1 with the exception that the vinyl chloride resin of the magnetic paint 1 for the upper layer used in Example 1 was changed to a resin in which a polar group was removed from the vinyl chloride resin.

EXAMPLE 4

<Paint 1 for Lower Layer>

| | |
|---|---|
| Granular $\alpha$-$Fe_2O_3$ (FRO-3, manufactured by Sakai Chemical Industry Co., Ltd.) (average particle size: 30 nm, BET = 45 $m^2$/g) | 55 parts by weight |
| Carbon black (#45B, manufactured by Mitsubishi Chemical Corporation) (particle size: 24 nm, BET: 125 $m^2$/g, DBP oil absorption: 47 ml/100 g) | 30 parts by weight |
| $\alpha$-$Al_2O_3$ (AKP30, manufactured by Sumitomo Chemical Co., Ltd. (average particle size: 0.33 $\mu$m, BET: 8 $m^2$/g) | 15 parts by weight |
| Vinyl chloride-vinyl acetate copolymer (MK6, manufactured by Nisshin Kagaku Kogyo Co., Ltd.) (polymerization degree: 350, polar groups: carboxylic acid = 0.5% and N content of ammonium salt = 300 ppm) | 12 parts by weight |
| Phosphobetaine-containing polyurethane resin which comprises phosphobetaine as polar groups obtained by a reaction of N-methyl-diethanolamine and phenylphosphonic acid (Mw = 40,000, polar group concentration: 1.5 groups/molecule | 4 parts by weight |
| —$SO_3Na$-containing polyurethane resin (Mn = 25,000, polar group concentration: 1 group/molecule) | 2 parts by weight |
| Isocetyl stearate | 10 parts by weight |
| Butyl stearate | 4 parts by weight |
| Sorbitan monostearate | 3 parts by weight |
| MEK | 150 parts by weight |
| Toluene | 50 parts by weight |
| Cyclohexanone | 50 parts by weight |

The above-mentioned composition was kneaded, and then, dispersed in a sand grinder to prepare paint 1 for a lower layer.

Then, 4 parts by weight of Coronate L manufactured by Nippon Polyurethane Co., Ltd. was added to the paint 1 for the lower layer, and similarly, 4 by weight of Coronate L was added to the magnetic paint 1 for the upper layer. First, the paint 1 for the lower layer was applied to a 62-$\mu$m thick PET film having a surface roughness (Ra) of 9 nm so as to give a thickness of 1.5 $\mu$m (dry film thickness) by the extrusion die nozzle process, and subsequently, the magnetic paint 1 for the upper layer was applied so as to give a thickness of 0.3 $\mu$m (dry film thickness) by the extrusion die nozzle process, while the paint 1 for the lower layer was still in a wet state, followed by non-orientation with a non-orientation magnet. After drying at a drying temperature of 100° C., calendaring treatment was carried out at a linear pressure of 300 kg/cm at a temperature of 60° C. to form a coated film on one side. Then, in a similar procedure, a coated film was formed on the other side of the PET film to prepare a raw sheet roll having magnetic layers on both side.

Finally, this raw sheet roll was stamped out in a disk form, followed by thermosetting at 70° C. for 24 hours to prepare a disk. prepare a disk.

EXAMPLE 5

A disk was prepared in the same manner as with Example 4 with the exception that the phosphobetaine-containing polyurethane resin of the paint for the magnetic layer used in Example 4 was changed to a polyurethane resin containing phosphamine obtained by a reaction of diethanolamine and phenylphosphonic acid.

EXAMPLE 6

A disk was prepared in the same manner as with Example 4 with the exception that the phosphobetaine-containing polyurethane resin of the paint for the magnetic layer used in Example 4 was changed to a polyurethane resin containing a phosphobetaine obtained by a reaction of N-methyldiethanolamine and phenylphosphonic acid and a phosphamine obtained by a reaction of diethanolamine and phenylphosphonic acid per one molecule of the polyurethane resin.

EXAMPLE 7
<Magnetic Paint 2 for Upper Layer>

| | |
|---|---|
| Magnetic metal powder (HC = 1,650 Oe, σS = 126 emu, BET = 58 m²/g, pH = 10, average length of major axis: 0.32 μm, Fe/Co/Ni = 100/5/5 (weight ratio), containing Al and Si as additive elements) | 100 parts by weight |
| Vinyl chloride copolymer (MR110, manufactured by Nippon Zeon Co., Ltd.) (polymerization degree: 300, polar group: —OSO₃K = 1.5 groups/molecule) | 14 parts by weight |
| Phosphobetaine-containing polyurethane resin which comprises phosphobetaine as polar groups obtained by a reaction of N-methyl-diethanolamine and phenylphosphonic acid (Mw = 40,000, polar group concentration: 1.5 groups/molecule | 6 parts by weight |
| α-Al₂O₃ (AKP30, manufactured by Sumitomo Chemical Co., Ltd.) (average particle size: 0.33 μm, BET: 8 m²/g) | 10 parts by weight |
| Cr₂O₃ (S-1, manufactured by Nippon Industrial Chemical Co., Ltd.) (average particle size: 0.40 μm, BET: 3 m²/g) | 5 parts by weight |
| Carbon black (Sevacurve MT manufactured by Colombian Carbon Co.) (particle size: 350 nm, BET: 7 m²/g, DBP oil absorption: 41 ml/100 g) | 3 parts by weight |
| Sorbitan monostearate | 3 parts by weight |
| Isocetyl stearate | 3 parts by weight |
| Butyl stearate | 2 parts by weight |
| MEK | 250 parts by weight |
| Toluene | 80 parts by weight |
| Cyclohexanone | 80 parts by weight |

The above-mentioned composition was kneaded, and then, dispersed in a sand grinder mill to prepare magnetic paint 2 for an upper layer.

Then, 4 parts by weight of Coronate L manufactured by Nippon Polyurethane Co., Ltd. was added to the paint 1 for the lower layer, and similarly, 4 parts by weight of Coronate L was added to the magnetic paint 2 for the upper layer. First, the paint 1 for the lower layer was applied to a 62-μm thick PET film having a surface roughness (Ra) of 9 nm so as to give a thickness of 1.5 μm (dry film thickness) by the extrusion die nozzle process, and subsequently, the magnetic paint for the upper layer was applied so as to give a thickness of 0.3 μm (dry film thickness) by the extrusion die nozzle process, while the paint 1 for the lower layer was still in a wet state, followed by non-orientation with a non-orientation magnet. After drying at a drying temperature of 100° C., calendaring treatment was carried out at a linear pressure of 300 kg/cm at a temperature of 60° C. to form a coated film on one side. Then, in a similar procedure, a coated film was formed on the other side of the PET film to prepare a raw sheet roll having magnetic layers on both side.

Finally, this raw sheet roll was stamped out in a disk form, followed by thermosetting at 70° C. for 24 hours to prepare a disk.

EXAMPLE 8

A disk was prepared in the same manner as with Example 4 with the exception that the magnetic metal powder of the magnetic paint 1 for the upper layer used in Example4 was changed to the following magnetic powder to prepare magnetic paint 3 for the upper layer.

<Magnetic Powder of Magnetic Paint 3 for Upper Layer>

| | |
|---|---|
| Magnetic metal powder | 100 parts by weight |

(Hc = 2,400 Oe, σS = 143 emu, BET = 51 m²/g, pH = 10, average length of major axis: 0.1 μm, Fe/Co = 100/30 (weight ratio), containing Al and Y as additive elements)

EXAMPLE 9

A disk was prepared in the same manner as with Example 7 with the exception that the amount of the vinyl chloride resin was changed to 12 parts by weight, and that of the phosphobetaine-containing polyurethane resin to 8 parts by weight.

EXAMPLE 10
<Paint 2 for Lower Layer>

| | |
|---|---|
| Granular α-Fe₂O₃ (FRO-3, manufactured by Sakai Chemical Industry Co., Ltd.) (average particle size: 30 nm, BET = 45 m²/g) | 55 parts by weight |
| Carbon black (#45B, manufactured by Mitsubishi Chemical Corporation) (particle size: 24 nm, BET: 125 m²/g, DBP oil absorption: 47 ml/100 g) | 30 parts by weight |
| α-Al₂O₃ (AKP30, manufactured by Sumitomo Chemical Co., Ltd.) (average particle size: 0.33 μm, BET: 8 m²/g) | 15 parts by weight |
| EB-hardenable vinyl chloride copolymer (TBO246, 30% solution, manufactured by Toyobo Co., Ltd.) (polymerization degree: 300, polar group: —OSO₃K = 1.5 groups/molecule) | 12 parts by weight |
| EB-hardenable polyurethane resin (TBO242, 35% solution, manufactured by Toyobo Co., Ltd.) (Mn = 25,000, polar group: sodium hypophosphite = 1 group/molecule) | 4 parts by weight |
| Multifunctional acrylic monomer (TA505, manufactured by Sanyo Chemical Industries, Ltd.) | 2 parts by weight |
| Isocetyl stearate | 10 parts by weight |
| Butyl stearate | 4 parts by weight |
| Sorbitan monostearate | 3 parts by weight |
| MEK | 126 parts by weight |
| Toluene | 38 parts by weight |
| Cyclohexanone | 38 parts by weight |

The above-mentioned composition was kneaded, and then, dispersed in a sand grinder mill to prepare paint 2 for a lower layer. Then, the paint 2 for the lower layer was applied to a 62-μm thick PET film having a surface roughness (Ra) of 9 nm so as to give a thickness of 1.5 μm (dry film thickness) by the extrusion die nozzle process. After drying at a drying temperature of 100° C., calendaring treatment was carried out at a linear pressure of 300 kg/cm at a temperature of 60° C., and finally, EB irradiation (5 Mrad) was conducted. Then, the other side of the PET film was also formed in a similar procedure to prepare a sheet roll having undercoat layers on both sides.

Then, 4 parts by weight of Coronate L manufactured by Nippon Polyurethane Co., Ltd. was added to the magnetic paint 1 for the upper layer. The roll was coated with the resulting magnetic paint for the upper layer so as to give a thickness of 0.3 μm (dry film thickness) by the extrusion die nozzle process, followed by non-orientation with a non-orientation magnet. After drying at a drying temperature of 100° C., calendaring treatment was carried out at a linear pressure of 300 kg/cm at a temperature of 60° C. to form a coated film on one side. Then, in a similar procedure, a coated film was formed on the other side of the PET film to prepare a raw sheet roll having magnetic layers on both side.

Finally, this raw sheet roll was stamped out in a disk form, followed by thermosetting at 70° C. for 24 hours to prepare a disk.

Comparative Example 8

A disk was prepared in the same manner as with Example 5 with the exception that the phosphobetaine-containing polyurethane resin of the magnetic paint for the upper layer used in Example 5 was changed to a polyurethane resin having no polar group.

Comparative Example 9

A disk was prepared in the same manner as with Example 5 with the exception that the phosphobetaine-containing polyurethane resin of the magnetic paint for the upper layer used in Example 5 was changed to a polyurethane resin having sulfobetaine as a polar group.

Comparative Example 10

A disk was prepared in the same manner as with Example 5 with the exception that the phosphobetaine-containing polyurethane resin of the magnetic paint for the upper layer used in Example 5 was changed to a polyurethane resin having sodium sulfamate as a polar group.

Comparative Example 11

A disk was prepared in the same manner as with Example 5 with the exception that the phosphobetaine-containing polyurethane resin of the magnetic paint for the upper layer used in Example 5 was changed to a polyurethane resin having sodium phosphate as a polar group.

Comparative Example 12

A disk was prepared in the same manner as with Example 5 with the exception that the phosphobetaine-containing polyurethane resin of the magnetic paint for the upper layer used in Example 5 was changed to a polyurethane resin having sodium sulfonate as a polar group.

Comparative Example 13

A disk was prepared in the same manner as with Example 5 with the exception that the phosphobetaine-containing polyurethane resin of the magnetic paint for the upper layer used in Example 5 was changed to a polyurethane resin having an ammonium salt as a polar group.

Comparative Example 14

A disk was prepared in the same manner as with Example 5 with the exception that the vinyl chloride resin of the magnetic paint for the upper layer used in Example 5 was changed to a resin in which a polar group was removed from the vinyl chloride resin.

Comparative Example 15

A disk was prepared in the same manner as with Example 10 with the exception that the phosphobetaine-containing polyurethane resin of the magnetic paint for the upper layer used in Example 8 was changed to a polyurethane resin having sodium sulfonate as a polar group.

[Experimental Data]

For the disks prepared in Examples and Comparative Examples, the following items were measured.

(1) Dispersion Gloss of Magnetic Layer (degree of gloss of surface of a magnetic coated film which was prepared by coating dispersed magnetic paint on PET film by a small applicator)

(2) Surface Roughness (Ra) of Medium (3) Surface Observation of Medium under Optical Microscope (Fine Coating Streak)

(4) Output (5) Durability

TABLE 1

Experimental Results 1

|  | E. 1 | E. 2 | E. 3 | C.E. 1 | C.E. 2 |
|---|---|---|---|---|---|
| Dispersion Gloss of Upper Layer (%) | 140 | 138 | 138 | 120 | 130 |
| Ra (nm) | 5.3 | 5.5 | 5.3 | 7.5 | 6.1 |
| Fine Coating Streaks | ○ | ○ | ○ | X | Δ |
| Output (%) |  |  |  |  |  |
| 625 kHz | 100 | 102 | 100 | 90 | 100 |
| 1200 kHz | 105 | 100 | 103 | 85 | 96 |
| Durability (10,000 pass) | 3000 | 2800 | 2800 | 850 | 1500 |

|  | C.E. 3 | C.E. 4 | C.E. 5 | C.E. 6 | C.E. 7 |
|---|---|---|---|---|---|
| Dispersion Gloss of Upper Layer (%) | 132 | 133 | 133 | 115 | 95 |
| Ra (nm) | 6.0 | 6.2 | 6.0 | 8.9 | 10.5 |
| Fine Coating Streaks | Δ | Δ | Δ | X | X |
| Output (%) |  |  |  |  |  |
| 625 kHz | 100 | 100 | 100 | 90 | 80 |
| 1200 kHz | 97 | 95 | 95 | 80 | 70 |
| Durability (10,000 pass) | 1400 | 1200 | 1300 | 300 | 300 |

E.: Example
C.E.: Comparative Example

<Measuring Methods>

Electromagnetic Characteristics

An FD-1331 drive manufactured by NEC Corp. was connected to an HFQ-35 tester manufactured by Expert Magnetex Co. for measurement. Measured values were determined, taking the output of a drive maker's reference disk as 100%.

Durability

Using an FD-1331 drive manufactured by NEC Corp., a head was continuously run on the same track in the cycle environment shown in FIG. 1 indicated below, and the pass number until a scratch was formed on a coated film was measured.

<Measuring Method of Surface Roughness>

Measuring instrument: a Talystep system manufactured by Tailor-Hobson Co.

Measuring conditions: filter conditions 0.18 Hz to 9 Hz

Tracer: a 0.1×2.5 μm special stylus

Tracer pressure: 2 mg

Measuring speed: 0.03 mm/second

Measuring length: 500 μm

<Measuring Method of Gloss>

Measuring instrument: a GM-3D gloss meter manufactured by Murakami Color Research Laboratory (incident angle-reflection angle: 60°-60°)

<Method for Observing Fine Coating Streak>

Observed at X50 magnification under an optical microscope, and classified into the following three ranks in an interfered state:

No fine coating streak is observed: ○
A fine coating streak is slightly observed: Δ
A fine coating streak is clearly observed: x

TABLE 2

Experimental Results 2

|  | E. 4 | E. 5 | E. 6 | E. 7 | E. 8 | E. 9 | E. 10 | C.E. 8 |
|---|---|---|---|---|---|---|---|---|
| Dispersion Gloss of Upper Layer (%) | 140 | 138 | 138 | 140 | 160 | 139 | 140 | 120 |
| Ra (nm) | 5.2 | 5.3 | 5.2 | 5.3 | 5.9 | 5.1 | 5.5 | 7.5 |
| Fine Coating Streaks | ○ | ○ | ○ | ○ | ○ | ○ | ○ | X |
| Output (%) |  |  |  |  |  |  |  |  |
| 1 MHz | 100 | 102 | 100 | 100 | 100 | 100 | 100 | 90 |
| 4.5 MHz | 105 | 100 | 102 | 102 | 100 | 103 | 98 | 85 |
| Durability (hours) | 2000 | 1900 | 2000 | 2000 | 1800 | 1700 | 1400 | 400 |

|  | C.E. 9 | C.E. 10 | C.E. 11 | C.E. 12 | C.E. 13 | C.E. 14 | C.E. 15 |
|---|---|---|---|---|---|---|---|
| Dispersion Gloss of Upper Layer (%) | 130 | 132 | 133 | 133 | 115 | 95 | 133 |
| Ra (nm) | 6.5 | 6.5 | 6.8 | 6.5 | 8.9 | 10.5 | 6.4 |
| Fine Coating Streaks | Δ | Δ | Δ | Δ | X | X | Δ |
| Output (%) |  |  |  |  |  |  |  |
| 1 MHz | 100 | 100 | 100 | 100 | 90 | 80 | 100 |
| 4.5 MHz | 95 | 95 | 93 | 95 | 80 | 70 | 95 |
| Durability (hours) | 1500 | 600 | 500 | 600 | 300 | 300 | 50 |

<Measuring Methods>

Electromagnetic Characteristics

Measured at a rotational speed of 2940 rpm, using a GUZIK electromagnetic characteristic measuring instrument.

Measured values were determined, taking the output of a drive maker's reference disk as 100%.

Durability

Figure 1:
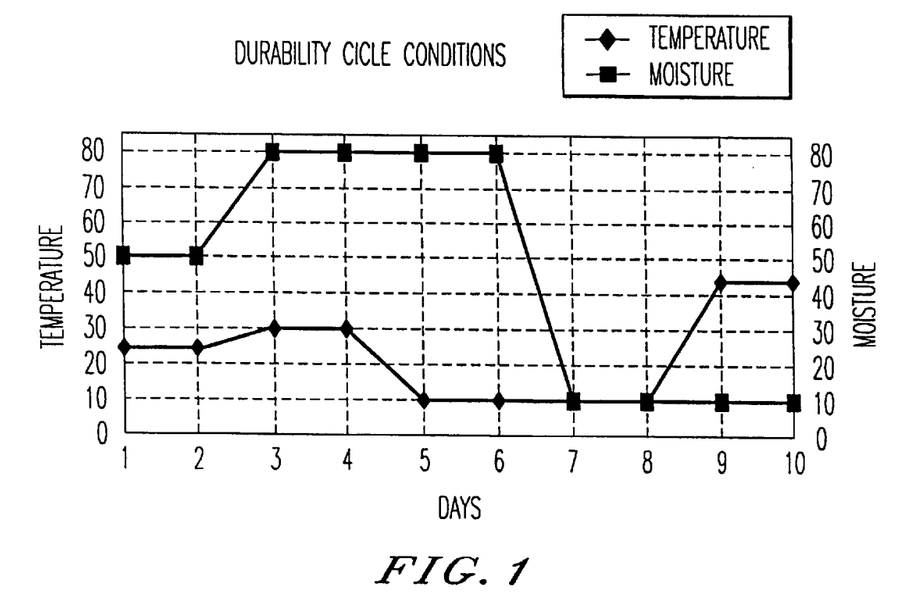
FIG. 1 is a graph showing durability cycle conditions in measuring the durability.

A disk was inserted into a ZIP drive rotating at a rotational speed of 2940 rpm, and a head was randomly sought in the cycle environment as shown in FIG. 1. The presence or absence of a scratch was visually confirmed. The test was terminated at the time when a scratch was formed.

<Measuring Method of Surface Roughness)

Measuring instrument: a Talystep system manufactured by Tailor-Hobson Co.

Measuring conditions: filter conditions 0.18 Hz to 9 Hz
Tracer: a 0.1×2.5 μm special stylus
Tracer pressure: 2 mg
Measuring speed: 0.03 mm/second
Measuring length: 500 μm <Measuring Method of Gloss>

Measuring instrument: a GM-3D gloss meter manufactured by Murakami Color Research Laboratory (incident angle-reflection angle: 60°- 60°)

<Method for Observing Fine Coating Streak>

Observed at X50 magnification under an optical microscope, and classified into the following three ranks in an interfered state:

No fine coating streak is observed: ○
A fine coating streak is slightly observed: Δ
A fine coating streak is clearly observed: x According to the present invention, the magnetic recording media can be obtained which are excellent in dispersibility, small in surface roughness (Ra) and have no fine coating streaks, namely are excellent in surface properties, good in electromagnetic characteristics and excellent in durability.

What is claimed is:

1. A magnetic recording medium comprising a non-magnetic support and a magnetic layer formed thereon, in which said magnetic layer comprises a ferromagnetic powder and binders, wherein the binders comprise a vinyl chloride resin having a S-containing polar group and a polyurethane resin having phosphobetaine or phosphamine or both as a polar group.

2. The magnetic recording medium according to claim 1, in which said magnetic layer comprises a ferromagnetic powder, an abrasive and carbon black.

3. The magnetic recording medium according to claim 2, in which said abrasive is selected from the group consisting of —$Al_2O_3$ and $Cr_2O_3$.

4. The magnetic recording medium according to claim 3, wherein said —$Al_2O_3$ has a particle size of from 0.1 μm to 1.0 μm.

5. The magnetic recording medium according to claim 4, wherein said —$Al_2O_3$ has a particle size of from 0.2 μm to 0.5 μm.

6. The magnetic recording medium according to claim 3, wherein said $Cr_2O_3$ has a particle size of from 0.1 μm to 1.0 μm.

7. The magnetic recording medium according to claim 6, wherein said $Cr_2O_3$ has a particle size of from 0.2 μm to 0.5 μm.

8. The magnetic recording medium according to claim 1, in which said magnetic recording medium has a non-magnetic layer between the magnetic layer and the non-magnetic support.

9. The magnetic recording medium according to claim 8, in which the average thickness of the magnetic layer is 1.0 μm or less, and the average thickness of the non-magnetic layer is 1 μm to 3 μm.

10. The magnetic recording medium according to claim 8, in which the non-magnetic layer is formed on the non-magnetic support, and the magnetic layer is formed thereon in multiple layers simultaneously or successively while the non-magnetic layer is still in a wet state.

11. The magnetic recording medium according to claim 8, in which the non-magnetic layer is formed on the non-magnetic support, and after drying and hardening thereof, the magnetic layer is formed thereon.

12. The magnetic recording medium according to claim 1, in which the ferromagnetic powder is a magnetic metal powder having a coercive force (Hc) of 1300 Oe to 2800 Oe.

13. The magnetic recording medium according to claim 1, wherein said polyurethane is a polyurethane containing phosphobetaine which is a salt which comprises a salt of an ammonium ion as a cation, and a phosphonic acid ion, phosphinic acid ion or acid phosphate compound ion as an anion.

14. The magnetic recording medium according to claim 13, wherein said polyurethane is a polyurethane containing phosphamine which is an amide of phosphonic acid, phosphinic acid or acid phosphate compound.

15. The magnetic recording medium according to claim 1, wherein said polar group in said polyurethane resin is present in an amount of from 0.01 μmol/g to 1.0 μmol/g.

16. The magnetic recording medium according to claim 15, wherein said polar group is present in an amount of from 0.03 µmol/g to 0.5 µmol/g.

17. The magnetic recording medium according to claim 1, wherein said polyurethane resin has a number average molecular weight of from about 5,000 to 200,000.

18. The magnetic recording medium according to claim 17, wherein said polyurethane resin has a number average molecular weight of from about 10,000 to 100,000.

19. The magnetic recording medium according to claim 1, wherein said polyurethane resin is obtained from a polymerization monomer prepared by reacting an aminodiol with a phosphonic acid compound, phosphinic acid compound or acid phosphate compound.

20. The magnetic recording medium according to claim 19, wherein said aminodiol is selected from the group consisting of N-methyldiethanolamine, N-ethyldiethanolamine, N-phenyldiethanolamine and diethanolamine.

21. The magnetic recording medium recording to claim 19, wherein said phosphonic acid compound is selected from the group consisting of methylphosphonic acid, ethylphosphonic acid, phenylphosphonic acid, methylenediphosphonic acid, and octadecylphosphonic acid.

22. The magnetic recording medium according to claim 19, wherein said phosphinic acid compound is selected from the group consisting of phenylphosphinic acid, diphenylphosphinic acid and dimethylphosphinic acid.

23. The magnetic recording medium according to claim 19, wherein said acid phosphate compound is selected from the group consisting of amyl acid phosphate, 2-ethylhexyl acid phosphate, methyl acid phosphate, ethyl acid phosphate, and polyoxyethylene nonylphenyl ether phosphate.

24. The magnetic recording medium according to claim 19, wherein said polymerization monomer is prepared by reacting N-methyldiethanolamine with phenylphosphonic acid, octodecylphosphonic acid, methyl acid phosphate or polyoxyethylene nonylphenyl ether phosphate.

25. The magnetic recording medium according to claim 1, wherein said vinyl chloride resin has a polymerization degree in the range of 100 to 700.

26. The magnetic recording medium according to claim 1, wherein the polymethane resin and vinyl chloride resin are used as a mixture in a vinyl chloride/polyurethane ratio of from 9/1 to 5/5.

27. The magnetic recording medium according to claim 1, wherein the ferromagnetic powder is a magnetic oxide powder selected from the group consisting of $\gamma$-$Fe_2O_3$, Co-containing $\gamma$-$Fe_2O_3$, $\gamma$-$Fe_3O_4$, Co-containing $\gamma$-$Fe_3O_4$, $CrO_2$, barrium ferrite, and strontium ferrite.

28. The magnetic recording medium according to claim 1, wherein the ferromagnetic powder is a magnetic metal powder selected from the group consisting of Fe, Co, and Ni and alloys thereof.

* * * * *